US011238246B1

United States Patent
Pathak et al.

(10) Patent No.: US 11,238,246 B1
(45) Date of Patent: Feb. 1, 2022

(54) OMNI-DIRECTIONAL RFID SYSTEM FOR DOWNHOLE AND SURFACE EQUIPMENT

(71) Applicant: Baker Hughes Oilfield Operations LLC, Houston, TX (US)

(72) Inventors: Preeti Pathak, Irving, TX (US); Farhat Shaikh, Houston, TX (US); Otto Fanini, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/025,024

(22) Filed: Sep. 18, 2020

(51) Int. Cl.
*G06Q 30/00* (2012.01)
*G06K 7/10* (2006.01)
*G06K 19/07* (2006.01)
*G06K 19/06* (2006.01)

(52) U.S. Cl.
CPC ..... *G06K 7/10297* (2013.01); *G06K 19/0723* (2013.01); *G06K 2007/10504* (2013.01); *G06K 2019/06253* (2013.01)

(58) Field of Classification Search
CPC ............... G06K 7/10297; G06K 19/0723
USPC ........................................................ 235/385
See application file for complete search history.

(56) References Cited

U.S. PATENT DOCUMENTS

| 10,394,193 | B2 * | 8/2019 | Li ........................... E21B 47/26 |
| 2007/0023185 | A1 * | 2/2007 | Hall ...................... E21B 17/006 166/255.1 |
| 2012/0182130 | A1 * | 7/2012 | Sarchi .................... D07B 1/145 340/10.1 |
| 2019/0017366 | A1 * | 1/2019 | Alaas .................... E21B 47/092 |
| 2019/0026620 | A1 * | 1/2019 | Barney ............. G06K 19/0723 |
| 2020/0355054 | A1 * | 11/2020 | Fripp ...................... E21B 47/06 |
| 2020/0410177 | A1 * | 12/2020 | Shelton, IV ....... A61B 17/0469 |

OTHER PUBLICATIONS

International Search Report and Written Opinion dated Oct. 4, 2021 in corresponding PCT Application No. PCT/US2021/043993.

* cited by examiner

*Primary Examiner* — Ahshik Kim
(74) *Attorney, Agent, or Firm* — Hogan Lovells US LLP

(57) ABSTRACT

An asset identification system includes a tool having an axial dimension and a radial dimension. There are three RFID devices located on the tool, and the three RFID devices are located at equal angles with respect to each other in the radial dimension. The system further includes a storage apparatus configured to store the tool, and an RFID reader. At least one of the three RFID devices located on the tool is readable by the RFID reader regardless of the radial orientation of the tool with respect to the RFID reader.

20 Claims, 5 Drawing Sheets

OMNI-DIRECTIONAL RFID SYSTEM FOR DOWNHOLE AND SURFACE EQUIPMENT

BACKGROUND OF THE INVENTION

1. Field of the Invention

Embodiments disclosed herein relate generally to systems and tools for oil and gas operations. In particular, embodiments disclosed herein are related to radiofrequency identification (RFID) asset tracking for oil and gas systems.

2. Brief Description of Related Art

Oil and gas operations require the use of different types of specialized equipment. In particular, various kind of downhole tools are needed for different phases and types of operations. For example, during the drilling phase, a drill string is used. A drill string may include a bottom hole assembly which may include different tools such as navigation tools, drilling tools, logging tools, among others. The drill string also includes a series of tubulars to convey the bottom hole assembly to the bottom of a wellbore being drilled. Similarly, during the production phase, a series of tubing is suspended downhole to convey production fluid to the surface.

Some of these tools, whether they are electromechanical tools or tubulars, may be stored or transported on racks or other types of storage devices when not in use, and it is important to be able to keep track of these assets.

SUMMARY OF THE INVENTION

One aspect of the present technology provides and asset identification system. The asset identification system includes a tool having an axial dimension and a radial dimension. There are three RFID devices located on the tool, and the three RFID devices are located at equal angles with respect to each other in the radial dimension. The system further includes a storage apparatus configured to store the tool, and an RFID reader. At least one of the three RFID devices located on the tool is readable by the RFID reader regardless of the radial orientation of the tool with respect to the RFID reader. In some embodiments, the tool includes one or more surfaces around at least one of the three RFID devices, the one or more surfaces reflecting signals between the at least one RFID device and the RFID reader. In some embodiments, at least one of the three RFID devices is positioned in a recess formed in the tool. In some embodiments, at least one of the three RFID devices is positioned behind an outer surface of the tool. In some embodiments, the RFID reader is in a fixed position with respect to the storage apparatus. In some embodiments, the RFID reader is a handheld device and movable with respect to the storage apparatus. In some embodiments, the storage apparatus includes a storage apparatus RFID device located thereon, wherein the storage RFID device, when read by the RFID reader or a second RFID reader, indicates that the tool is stored on or in the storage device. In some embodiments, the three RFID devices are associated with three distinct device identifiers, respectively. In some embodiments, the three distinct device identifiers are associated with a single tool identifier.

In another example embodiment, an asset identification system includes a plurality of tools, each tool in the plurality of tools having an axial dimension and a radial dimension, and wherein each tool in the plurality of tools includes three RFID devices located thereon, the three RFID devices positioned equally apart from each other with respect to the radial dimension. The system also includes a storage system configured to store the plurality of tools, and an RFID reader located in a fixed position with respect to the storage system. At least one of the three RFID devices located on each tool is readable by the RFID reader regardless of the radial orientation of the downhole apparatus with respect to the storage system or the RFID reader. In some embodiments, the RFID reader is in a fixed position with respect to the storage system. In some embodiments, the RFID reader is a handheld device and movable with respect to the storage system. In some embodiments, the storage system includes a storage system RFID device located thereon, wherein the storage system RFID device, when read by the RFID reader or a second RFID reader, indicates that the tools are stored on or in the storage system. In some embodiments, the storage system includes at least one of a tool rack, a bin, a container, or a tool transport vehicle.

In yet another example embodiment, a method for oil and gas asset tracking includes moving a tool from a first position to a second position, wherein the tool has an axial dimension and a radial dimension, and wherein the tool has three RFID devices located thereon, the three RFID devices positioned equally apart from each other in the radial dimension. The method further includes reading at least one of the three RFID devices located on the tool by an RFID reader regardless of the radial orientation of the tool with respect to the RFID reader, and automatically updating data in an electronic database to associate the tool with the second position. In some embodiments, the second position is in or on a storage apparatus, and wherein the tool is placed onto or into the storage apparatus at any radial orientation with respect to the storage apparatus. In some embodiments, the second position is a geographical location. In some embodiments, the method further includes placing a plurality of tools into or onto a storage apparatus, wherein each tool in the plurality of tools has three RFID devices located thereon, the three RFID devices positioned equally apart from each other in the radial dimension, and reading at least one of the three RFID devices located on each of the plurality of tools by the RFID reader regardless of the radial orientation of the tools with respect to the RFID reader. In some embodiments, moving the tool from the first position to the second position is a part of an operation utilizing tool, and wherein automatically updating data in an electronic database to associate the tool with the second position indicates that the tool is used as a part of the operation.

BRIEF DESCRIPTION OF THE DRAWINGS

The present technology can be better understood on reading the following detailed description of nonlimiting embodiments thereof, and on examining the accompanying drawings, in which.

DETAILED DESCRIPTION

Figure 1:
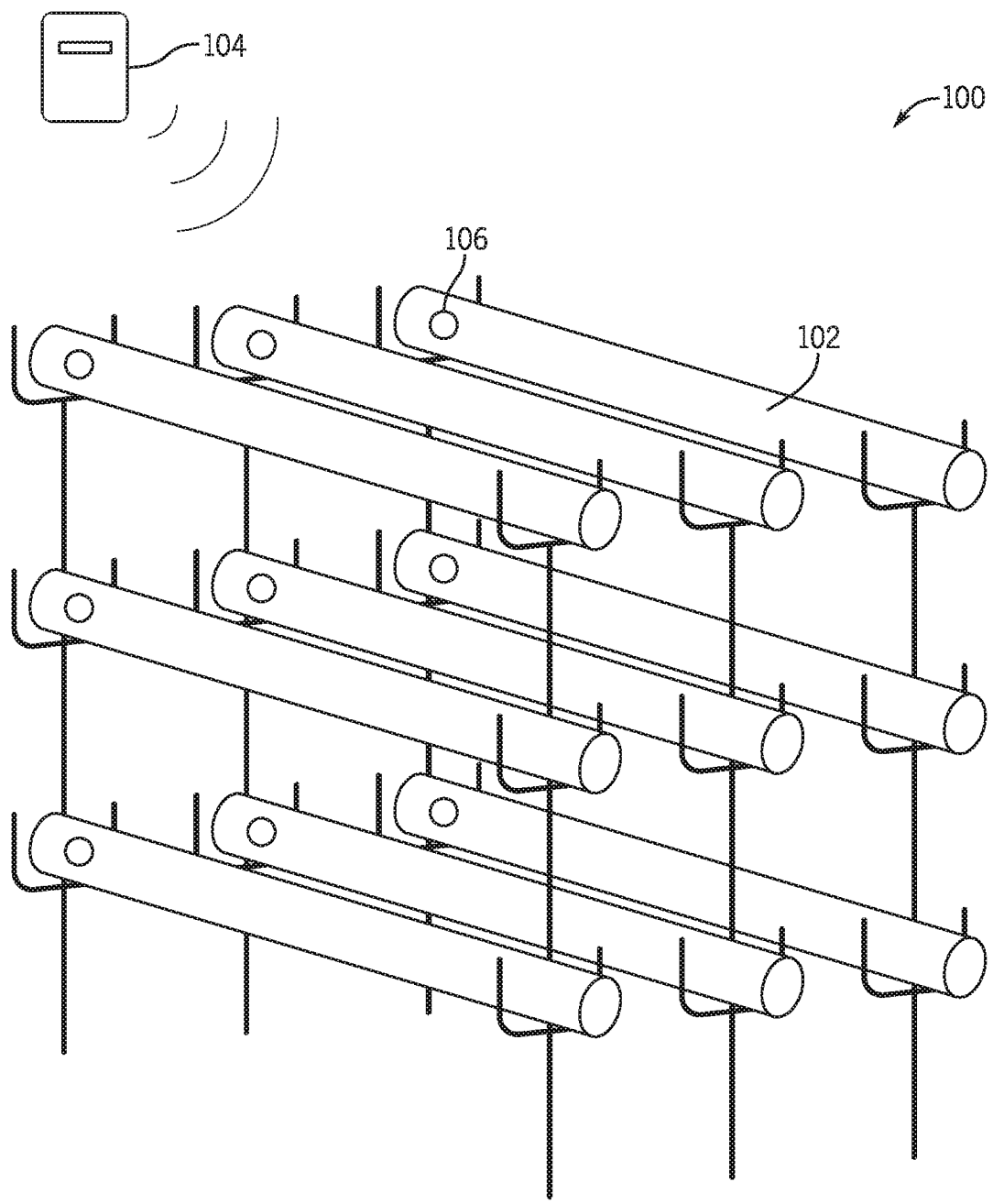
FIG. 1 illustrates a rack of cylindrical oil and gas tools, in accordance with example embodiments.

The foregoing aspects, features, and advances of the present technology can be further appreciated when considered with reference to the following description of preferred embodiments and accompanying drawings, wherein like reference numerals represent like elements. The following is directed to various exemplary embodiments of the disclosure. The embodiments disclosed should not be interpreted, or otherwise used, as limiting the scope of the disclosure, including the claims. In addition, those having ordinary skill in the art can appreciate that the following description has broad application, and the discussion of any embodiment is meant only to be exemplary of that embodiment, and not intended to suggest that the scope of the disclosure, including the claims, is limited to that embodiment.

The present disclosure provides for oil and gas tools with omni-directional RFID signaling. Specifically, three or more RFID devices are placed around such a tool with substantially cylindrical outer geometry. In this disclosure, cylindrical includes geometries with square, hexagonal, oval, or otherwise shaped cross-sectional profiles, and not limited to circular cross-sectional profiles. The placement of three devices enables at least one of the RFID device to be read instantly independently from its azimuthal position in the rack, transport carrier or storage bin. This leads to great time savings and enables automated reading of RFID devices as they move around or a robotic RFID reader moves around the field shop or storage area. Without three RFID devices placed azimuthally around a tool, its possible that a reader cannot read the devices if the tool is not oriented in a certain way. The tool must then be manually rotated to be read, which requires added time and labor.

FIG. 1 illustrates a rack 100 of cylindrical oil and gas tools 102, in accordance with example embodiments. The tools 102 may be of any type, including but not limited to casing, drill pipe, production pipe, pipeline pipes, packers, drill bits, pumping equipment, valving equipment, bottom hole tools such as logging tools, navigation tools, drilling tools, and other related equipment. When such tools 102 are not in use, they are typically stored on a rack 100 as shown, in a container, or other type of storage device. The tools 102 may also be transported in such a storage device. In some embodiment, a specialized lift may lift a tool directly from the rack and into alignment to be assembled onto a downhole string to be positioned downhole.

For many reasons, it is important to keep track of these tools 102, such as their location, usage, operations served, and various other useful data. In order to do so, each tool 102 needs to have an electronic identifier to which such data can be attached. Unique Radio Frequency Identification (RFID) devices 106 may be attached to each tool 102 and scanned at various times to register a status of the tool 102. Although most RFID devices 106 do not require line of sight to be read, the electromagnetic signal can still become obstructed or attenuated, for example by the body of the tool 102. Thus, in order for an RFID reader 104 to read an RFID device, it must be oriented in a way such that allows the electromagnetic signals of adequate strength to pass between the RFID device 106 and RFID reader 104. If only one or even two RFID devices 106 are placed on a cylindrical tool 102, the tool may need to be manually rotated or reconfigured in order to be ready by an RFID reader, especially if the RFID reader is mounted in a fixed position. In some cases, a handheld RFID reader may be used by an operator. Even in this case, the operator may need to either rotate the tool or hold the RFID reader 104 in a position that is uncomfortable or otherwise inconvenient, all of which adds additional time and labor.

Thus, in accordance with present embodiments, the rack 100 (i.e., storage system) is configured to store the plurality of tools 102, in which each tool 102 has at least three RFID devices 106 located thereon. Thus, at least one of the three RFID devices 106 is readable by an RFID reader 104 from regardless of the radial/azimuthal orientation of the tool 102 and the RFID reader 104. In some embodiments, the rack 100 or storage system includes an RFID reader 104 located in a fixed position. For example, the RFID reader 104 may read an RFID device 106 of a tool 102 as the tool 102 is placed on/in the storage system or taken off/out of the storage system. In some embodiments, the RFID reader 104 may be a handheld tool that can be moved around with respect to the storage system 100 and the tools 102.

The RFID reader 104 may be communicatively coupled to a computer or directly connected to the internet via a wired or wireless communication protocol. Thus, the RFID reader 104 may send instructions updating an asset tracking record upon reading an RFID device of a tool. One or more status updates can then be made regarding the specific tool.

Figure 2A:
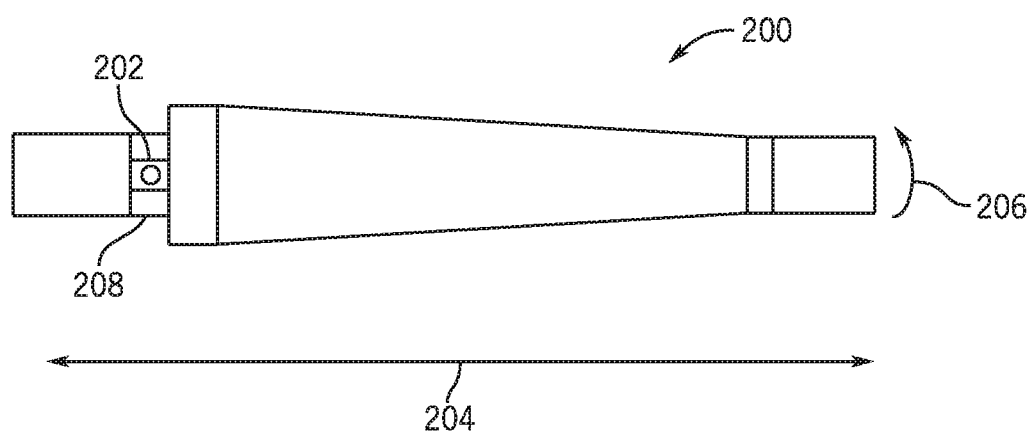
FIG. 2A illustrates a side view of an example tool having three RFID devices, in accordance with example embodiments.
Figure 2B:
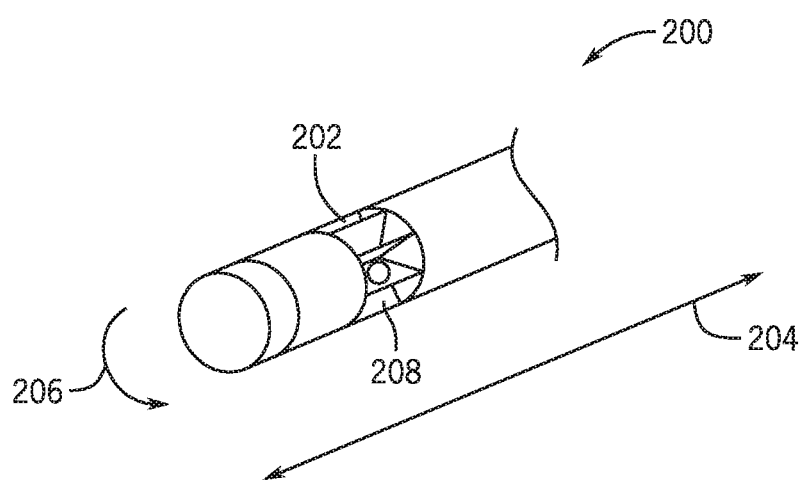
FIG. 2B illustrates a perspective view of the example tool having three RFID devices, in accordance with example embodiments.
Figure 2C:
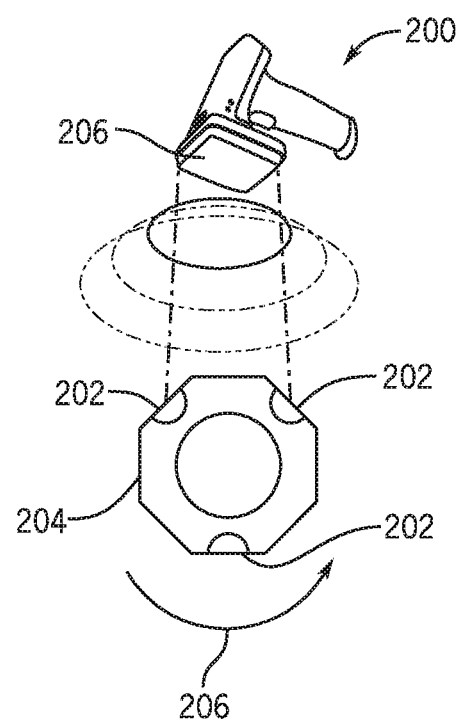
FIG. 2C illustrates a cross section view of the tool taken at the location of the RFID devices, in accordance with example embodiments.

FIG. 2A illustrates a side view of an example tool 200 having three RFID devices 202, in accordance with example embodiments. FIG. 2B illustrates a perspective view of the example tool 200. FIG. 2C illustrates a cross section view of the tool 200 taken at the location of the RFID devices 202. With references to FIGS. 2A, 2B, and 2C, the example tool 200 can be defined by at least an axial dimension 204 and a radial or azimuthal dimension 206. In the illustrated example, three RFID devices 202 are located on the tool 102 and positioned at equal angles with respect to each other in the radial dimension 206. The example tool 200 has a hexagonal portion 208 and the three RFID devices 202 are positioned at every other side of the hexagonal profile, thus at equal radial distances from one another. This configuration allows at least one of the RFID devices 202 to be read by an RFID reader 210 regardless of the radial orientation of the tool 200 with respect to the RFID reader 210. In some embodiments, the RFID devices 202 may be embedded into the surface of the tool, as illustrated, in which the RFID device 202 is flush with the surface. In other embodiments, the RFID devices 202 may be positioned elsewhere on the tool 200, such as around the circular portion. In some embodiments, the RFID devices 202 are located underneath or on an inner surface of an outer layer of the tool 200 and not immediately visible, but are still readable by an RFID reader 210.

In some embodiments, the RFID devices 202 are not located at equal (i.e., 120 degree) angles from each other. There can be some variations in the angles. Additionally, the reader 210 does not have to be perpendicular to an RFID device 202 to read it. The reader 210 can be aimed at various angles with respect to an RFID device 202, and still be able to read it.

As mentioned, the present techniques may be applied to many different types of tools, which may look different than the example tool in FIGS. 2A and 2B. Thus, the RFID devices may be positioned and attached to the tools in various different manners. In some embodiments, more than three RFID devices may be utilized. The example RFID devices illustrated herein are circular or disk shaped. However, other embodiments may have RFID devices of a wide variety of shapes and configurations. For example, in some embodiments, the RFID devices may be relatively flat stickers or cards, which may be flexible or inflexible.

Figure 3:
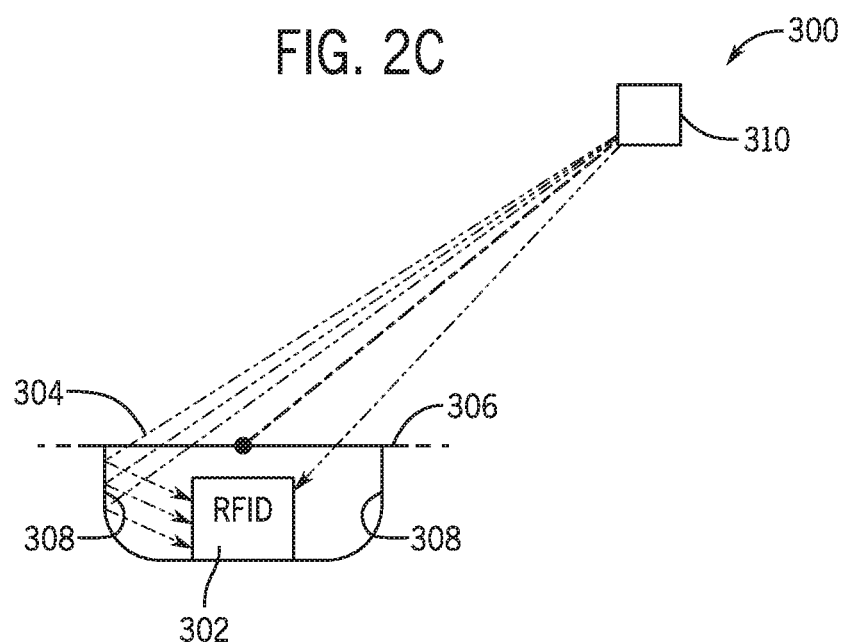
FIG. 3 illustrates a side view of an RFID device positioned in a recess formed in a tool, in accordance with example embodiments.

FIG. 3 illustrates a side view 300 of an RFID device 302 positioned in a recess 304 formed in a tool 306, in accordance with example embodiments. The recess 304 formed in the tool 306 provides one or more wall or surfaces 308 at least partially around the RFID device 302, such as side surface and bottom surface. In some embodiments, these surfaces 308 help to reflect signals between the RFID device 302 and an RFID reader 310, enhancing readability of the RFID device 302 at different angles. In some embodiments, there may be space between the side surface 308 and the RFID device 302, as shown. In some other embodiments, the RFID device 302 may fit snuggly within the recess 304 and there is no space or virtually no space between the RFID device 302 and the side surfaces 308.

Figure 4:
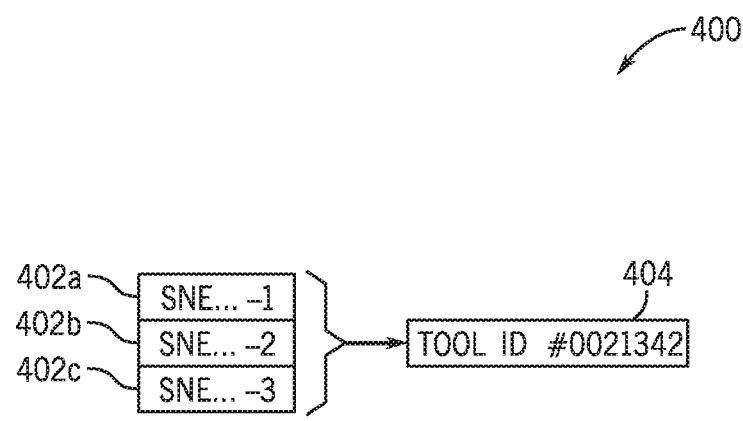
FIG. 4 illustrates an RFID tool identification system, in accordance with example embodiments.

FIG. 4 illustrates an RFID tool identification system 400, in accordance with example embodiments. Each of the three (or more) RFID devices on a single tool has a unique identifier. The three unique identifiers 402a, 402b, 402c are further associated with one single tool identifier 404 which identifies the tool on which the RFID devices are located. The single tool identifier 404 may be further associated with a plurality of data or records pertaining to the tool. For example, the data or records may include geographical location of the tool, name or identifier of the site where the tool is located, name or identifier of the storage apparatus the tool is in, the operations that the tool has been used in, the number of works hours the tool has been subject to, among others. The data or records may be updated when the RFID devices are read by an RFID reader. This allows the movement, location, usage, and other states of the tool to be tracked in real time or near real time.

Figure 5:
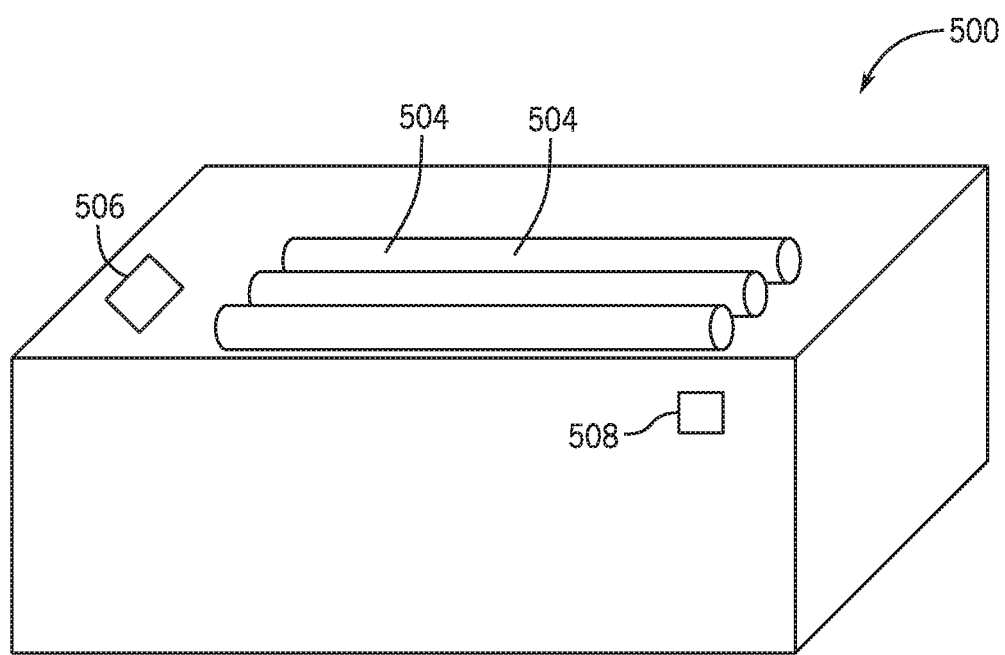
FIG. 5 illustrates another embodiment of a storage device configured to hold a plurality of tools with RFID devices, in accordance with example embodiments.

FIG. 5 illustrates another embodiment of a storage device 500 configured to hold a plurality of tools 502 with RFID devices 504, in accordance with example embodiments. The storage device 500 may be substantially enclosed, such as a container or bin, rather than the open rack illustrated in FIG. 1. For a substantially enclosed storage device, it may be difficult or impossible for an operator to move about the tools with an RFID reader to scan the tools. Thus, in such embodiments, the storage device may include a fixed RFID reader 506 on the inside that can read at least one RFID device 504 for each tool 502 stored therein, regardless of the radial position of the tool 502, and provide information about the contents of the storage device 500. In some embodiments, the storage device 500 itself may have an RFID device 508. The RFID device 508 of the storage device 500 may identify the storage device 500, and an identifier associated with the storage device 500 may be further linked to or provided information about which tools 502 are inside the storage device 500, or have been moved in or out of the storage device 500. Thus, tracking the location or status of the storage device also tracks the location and storage of the tools located therein.

In some embodiments, RFID readers may be positioned in various places, and not limited to storage or transportation devices. For example, an RFID reader may be mounted on rig equipment such that it can read the RFID devices of tools being run into hole or out of hole. This automatically tracks that a tool has been run downhole or pulled out of hole, and other data regarding the operation. Using such techniques, the location and history of any tool can be automatically logged without the manual intervention that is required by conventional techniques.

Figure 6:
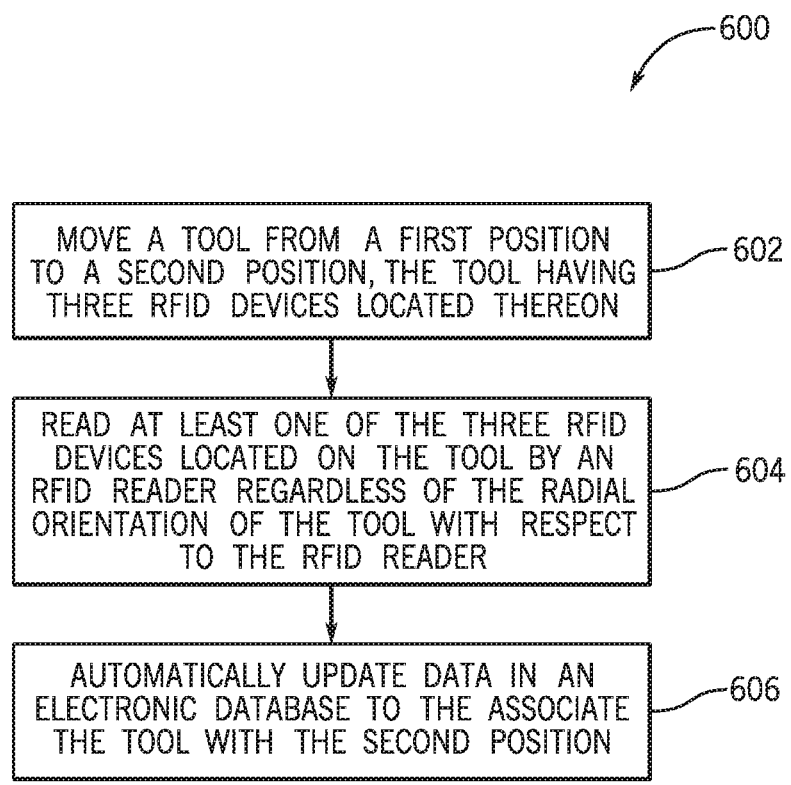
FIG. 6 is a flowchart illustrating a method of asset tracking, in accordance with example embodiments.

FIG. 6 is a flowchart illustrating a method 600 of asset tracking, in accordance with example embodiments. The example steps may be performed in the order presented, or in any other order. In some embodiments, there may be additional steps, or fewer steps. In this example, the method for oil and gas asset tracking includes moving 602 a tool from a first position to a second position. The tool has an axial dimension and a radial dimension. There are three RFID devices located on the tool, in which the three RFID devices positioned equally apart from each other in the radial dimension. The method further includes reading 604 at least one of the three RFID devices located on the tool by an RFID reader regardless of the radial orientation of the tool with respect to the RFID reader, and automatically updating 606 data in an electronic database to associate the tool with the second position.

In some embodiments, the second position is in or on a storage apparatus, and wherein the tool is placed onto or into the storage apparatus at any radial orientation with respect to the storage apparatus. In some embodiments, the second position is a geographical location. In some embodiments, the method further includes placing a plurality of tools into or onto a storage apparatus, wherein each tool in the plurality of tools has three RFID devices located thereon, the three RFID devices positioned equally apart from each other in the radial dimension, and reading at least one of the three RFID devices located on each of the plurality of tools by the RFID reader regardless of the radial orientation of the tools with respect to the RFID reader. In some embodiments, moving the tool from the first position to the second position is a part of an operation utilizing tool, and wherein automatically updating data in an electronic database to associate the tool with the second position indicates that the tool is used as a part of the operation.

Although radio frequency communications are described herein between readers and devices, it is understood that other types of wireless communications may be used, including, but not limited to near-field communications, Wi-Fi communications, BLUETOOTH® communications, and the like. For example, in some embodiments, near-field communication readers may extract asset identification information from near-field communication devices attached to the assets.

While the present disclosure has been described with respect to a limited number of embodiments, those skilled in the art, having benefit of this disclosure, can appreciate that other embodiments may be devised which do not depart from the scope of the disclosure as described herein. Accordingly, the scope of the disclosure should be limited only by the attached claims.

What is claimed is:

1. An asset identification system, comprising:
   a tool having an axial dimension and a radial dimension;
   at least three RFID devices located on the tool, the at least three RFID devices located at positions with respect to each other in the radial dimension;
   a storage apparatus storing the tool when the tool is not in use; and
   an RFID reader, wherein at least one of the RFID devices located on the tool is readable by the RFID reader regardless of the radial orientation of the tool with respect to the RFID reader.

2. The system of claim 1, wherein the tool includes one or more surfaces around at least one of the RFID devices, the one or more surfaces reflecting signals between the at least one RFID device and the RFID reader.

3. The system of claim 1, wherein at least one of the RFID devices is positioned in a recess formed in the tool or positioned behind an outer surface of the tool.

4. The system of claim 1, wherein the RFID devices are positioned at equal angles with respect to each other in the radial dimension.

5. The system of claim 1, wherein the RFID reader is in a fixed position with respect to the storage apparatus.

6. The system of claim 1, wherein the RFID reader is a handheld device and movable with respect to the storage apparatus.

7. The system of claim 1, wherein the storage apparatus includes a storage apparatus RFID device located thereon, wherein the storage RFID device, when read by the RFID reader or a second RFID reader, indicates that the tool is stored on or in the storage device.

8. The system of claim 1, wherein the at least three RFID devices are associated with at least three distinct device identifiers, respectively.

9. The system of claim 8, wherein the at least three distinct device identifiers are associated with a single tool identifier.

10. An asset identification system, comprising:
a plurality of tools, each tool in the plurality of tools having an axial dimension and a radial dimension, and wherein each tool in the plurality of tools includes at least three RFID devices located thereon, the three RFID devices positioned apart from each other with respect to the radial dimension;
a storage system storing the plurality of tools when the plurality of tools are not in use; and
an RFID reader located in a fixed position with respect to the storage system;
wherein at least one of the RFID devices located on each tool is readable by the RFID reader regardless of the radial orientation of the downhole apparatus with respect to the storage system or the RFID reader.

11. The system of claim 10, wherein the RFID reader is in a fixed position with respect to the storage system.

12. The system of claim 10, wherein the RFID reader is a handheld device and movable with respect to the storage system.

13. The system of claim 10, wherein the storage system includes a storage system RFID device located thereon, wherein the storage system RFID device, when read by the RFID reader or a second RFID reader, indicates that the tools are stored on or in the storage system.

14. The system of claim 10, wherein the storage system includes at least one of a tool rack, a bin, a container, or a tool transport vehicle.

15. A method for oil and gas asset tracking, comprising:
moving a tool into or out of a storage apparatus, the storage apparatus storing the tool when the tool is not in use, wherein the tool has an axial dimension and a radial dimension, and wherein the tool has at least three RFID devices located thereon, the at least three RFID devices positioned apart from each other in the radial dimension;
reading at least one of the RFID devices located on the tool by an RFID reader regardless of the radial orientation of the tool with respect to the RFID reader; and
automatically updating data in an electronic database to associate the tool with the second position.

16. The method of claim 15, wherein the second position is in or on a storage apparatus, and wherein the tool is placed onto or into the storage apparatus at any radial orientation with respect to the storage apparatus.

17. The method of claim 15, wherein the second position is a geographical location.

18. The method of claim 15, further comprising:
placing a plurality of tools into or onto a storage apparatus, wherein each tool in the plurality of tools has at least three RFID devices located thereon, the at least three RFID devices positioned apart from each other in the radial dimension; and
reading at least one of the RFID devices located on each of the plurality of tools by the RFID reader regardless of the radial orientation of the tools with respect to the RFID reader.

19. The method of claim 15, wherein moving the tool from the first position to the second position is a part of an operation utilizing tool, and wherein automatically updating data in an electronic database to associate the tool with the second position indicates that the tool is used as a part of the operation.

20. The method of claim 15, wherein the at least three RFID devices are associated with at least three distinct device identifiers, respectively, and wherein the at least three distinct device identifiers are associated with a single tool identifier.

* * * * *